United States Patent [19]
Dam et al.
[11] Patent Number: 4,619,858
[45] Date of Patent: Oct. 28, 1986

[54] ADHESIVE PAPER MATERIAL AND A LABEL MADE FROM SUCH MATERIAL

[76] Inventors: Erik Dam, Anemonevej 12, DK-8870 Langaa; Erik Grönning, Hedeskovvej 9, DK-8520 Lystrup, both of Denmark

[21] Appl. No.: 590,584

[22] PCT Filed: Jun. 21, 1983

[86] PCT No.: PCT/DK83/00065

§ 371 Date: Feb. 21, 1984

§ 102(e) Date: Feb. 21, 1984

[87] PCT Pub. No.: WO84/00233

PCT Pub. Date: Jan. 19, 1984

[30] Foreign Application Priority Data

Jun. 22, 1982 [DK] Denmark ............................ 2792/82

[51] Int. Cl.[4] ........................ B32B 27/10; B32B 27/36

[52] U.S. Cl. .................................... 428/211; 428/335; 428/336; 428/342; 428/343; 428/481

[58] Field of Search .................. 428/156, 40, 41, 211, 428/204, 336, 335, 481, 342, 343; 156/240, 238, 239

[56] References Cited

U.S. PATENT DOCUMENTS

| | | | |
|---|---|---|---|
| 3,800,449 | 4/1974 | Minalodani et al. | 428/156 X |
| 3,854,229 | 12/1974 | Morgan | 428/40 X |
| 4,211,809 | 7/1980 | Barta | 428/211 X |
| 4,421,816 | 12/1983 | Arnold | 428/204 X |

*Primary Examiner*—Thomas J. Herbert
*Attorney, Agent, or Firm*—Antonelli, Terry & Wands

[57] ABSTRACT

A web for the production of self-adhesive paper labels consists of thin paper web and a very thin plastic sheet of polyester or a similar material of high tensile strength and low initial stretchability, yet of low tear strength due to its small thickness, e.g. 12 μm. Labels of such a web show a high tensile strength and a good flexibility, while they show a sufficient low tear strength to be usable as guarantee labels. In the production of the labels as left on a co-laminated backing sheet the so-called 'waste' may be drawn off at high speed, whereby the production may run at increased speed.

13 Claims, No Drawings

ADHESIVE PAPER MATERIAL AND A LABEL MADE FROM SUCH MATERIAL

The present invention relates to an adhesive paper sheet or web material and to labels made from such material.

Conventional self-adhesive paper labels consist of a rather strong, printable paper, usually of the specific weight 80 $g/m^2$. The rear side of the paper is provided with a pressure sensitive adhesive as covered by a backing or carrier sheet, which is treated or impregnated with a normally silicone based slip agent so as to be easily removable from the adhering side of the paper label just prior to use thereof. The backing sheet, in addition to its mere cover purpose, also serves to protect the adhesive from drying out, and a further important purpose thereof is connected with the production of the labels: Normally the single labels are produced on a continuous web of the backing sheet material as originally carrying a corresponding continuous paper web, the labels being provided as mutually spaced paper areas remaining on the backing web upon the paper web being cut to define these areas and upon the paper web outside these areas being removed from the backing web. These operations may take place in a continuous manner, e.g. in connection with the web passing a printing machine, whereby the label areas are printed and cut free of the surrounding paper, without the backing web being correspondingly cut. The said surrounding paper occurs as a continuous paper web having one or more rows of holes corresponding to the labels, and this web, the so-called "waste", is continuously drawn off the backing web so as to leave the backing web with one or more rows of mutually spaced paper labels. This product may be rolled up or cut into sheet members as carrying one or more labels, whether printed or not.

The said drawing off of the "waste" web from the backing web is a bottleneck operation as far as the production speed is concerned, because for a high speed of production it is necessary to exert a strong pull in the waste web, i.e. this perforated web should correspondingly show a high tensile strength. The said specific paper weight of 80 $g/m^2$ as generally used for the label paper refers to a paper, which is in most cases unnecessarily thick for the very labelling purpose, but necessary for enabling the production to run reasonably quickly without being stopped by ruptures of the drawn off waste web.

The use of a rather heavy paper quality for the label web may thus be seen as a compromise, and it is a more or less lucky compromise even from other and more special points of view. Thus, a special and important field of application of self-adhesive labels is a so-called guarantee sealing of packings or boxes, whereby a label as placed across a separation line between two material portions such as the body and the lid of a container should be able to generally resist considerable forces acting in the plane of the label material, while on the other hand the label should not be strong enough to enable unauthorized drawing off and remounting thereof, i.e. the label should be liable to be broken in a visible manner when attempts are made to draw it off the surface, on which it is mounted. In other words, the tearing off strength of the label should be smaller than the strength with which it adheres to the mounting surface, i.e. the tear strength should be rather small, while the general tensile strength should still be rather high for enabling a reasonably high production speed as mentioned above. These considerations, of course, are bound to lead to some compromise as to the strength of the paper, and generally the known compromises have been far from being really satisfactory.

In the said special field of application of the labels there are even further problems as connected with the flexibility of the label paper. When a label is applied across a separation line between mutually slightly movable elements such as the body and the lid of a container, the label should resist not only separation forces between these elements, but even compression forces between the elements, whereby the label will be liable to bulge out in the local area just outside the said separation line. Such local and narrow bulging of the label may well result in a label fracture even if the general tensile strength of the material is high, and such fractures are experienced quite often even when the paper material is as strong as corresponding to the said specific weight of 80 $g/m^2$. A label fracture along the separation line between the box and the lid portion of a container may cause serious troubles, if the label constitutes an authorized sealing means, e.g. on a meat container by transit shipping thereof. It has been suggested to reinforce the labels against fracturing by applying ordinary tape to the paper along the edge areas thereof, but this tends to make the labels unsuitably stiff, and besides such a reinforcing also tends to make it easier to effect unauthorized removal and remounting of the label, because the label is then easier to draw off its mounting surface without being ruptured thereby.

It is the purpose of the invention to provide an improved label sheet material, which is particularly advantageous for both the production and the use of the labels.

According to the invention the label sheet material comprises a very thin plastic sheet of high specific stiffness, which is arranged between the rear side of the paper sheet and the layer of adhesive, i.e. the plastic sheet is bonded at one side to the paper sheet and carries the layer of adhesive at its opposite side. Generally, the tensile strength and tearing strength of sheet materials of plastics are higher than for ordinary paper, but several plastic sheet materials, when being relatively stiff and very thin, have proved to show a general tensile strength, which, compared with paper, is still relatively high, while the tearing strength is not very high. Thus, a practically non-resilient polyester sheet with a thickness of only some 0.01 mm will add to the general tensile strength of the associated paper sheet, while it will not add correspondingly to the tearing strength thereof.

Therefore, a paper label as reinforced by a very thin plastic sheet of low stretchability on its rear side will still be usable as a guarantee label, because its tear strength is still sufficiently low to make the label rupture when it is sought to be drawn off its mounting surface, provided, of course, that the adhesive is of a good quality. Obviously, a material of high specific rigidity will be stiff even against bending, but with a thickness of only some 10–20 $\mu m$ the plastic sheet material will be perfectly flexible anyway.

The reinforcement with respect to the tensile strength is important for the general strength of the labels, but in fact there are two main aspects which should here be separately considered:

One of these main aspects relates to the production of the labels. The use of a generally reinforced web material as here discussed has shown a remarkable advantage in the production of the labels, viz. that the said "waste" can be safely pulled off at a considerably increased speed, whereby the general production speed in the label printing and forming process can be correspondingly increased.

The other of said two main aspects is that a satisfactory tensile strength of the labels is now obtainable with the use of a paper of reduced thickness, viz. with a preferred specific weight of about 60 $g/m^2$. The resulting tensile strength is satisfactory not only for the labels, in use, but even for the production, because the "waste" may still be pulled off at high speed.

The primary purpose of the label paper is to receive a desired printing and even hand writing, and this purpose is of course fulfilled even when the paper is relatively thin and therewith also cheap. Such a thin paper, however, also contributes to an increased flexibility of the label, and the additional use of an extremely thin plastic sheet, as mentioned, does not substantially counteract such an increased flexibility while it adds to the flexing suppleness. Therefore, with the use of the paper of reduced thickness as practically conditioned by the invention, the labels will be flexible enough to be nonsensible to local bulgings, and also for this reason, therefore, the labels will be extremely well suited for use as guarantee labels to be mounted across the separation line between a container and a lid or another cover thereof. Also, the thin and flexible labels are mountable on surfaces of non-planar shape better than conventional, less flexible labels.

Plastic sheet materials as here referred to for use as a reinforcing material inherently show the characteristic of being very tight, irrespective of the desired small thickness of the sheet. This leads to a further advantage, viz. that the plastic sheet, when unperforated, forms a sealing membrane between the paper and the adhesive, whereby the latter is prevented from intruding into the paper. So far it has been found natural that the adhesive tends to intrude into the paper, and problems have even existed in preventing the adhesive from later on occurring on the front side of the paper. It has been quite customary to overdose the adhesive to the paper just for making sure that the adhesive would remain surface active. Attempts have been made to provide for a barrier layer between the adhesive and the paper, but so far not with commercial success and not based on the use of a sheet material adding tensile strength to the product.

Thus, the preferred use of a thin label paper in combination with the said very thin plastic sheet does not involve any increased risk of the adhesive "bleeding" through the paper. The plastic sheet is, easily bonded to the paper e.g. by means of a lacquer, and with the use of the plastic sheet the adhesive itself may be applied according to minimum requirements, without the said usual overdosage.

The problem as to the adhesive bleeding through the paper has been pronounced particularly with labels to be mounted on non-porous surfaces, and for some special labels the paper has been substituted by a more expensive plastic sheet material, which, however, involves an expensive printing technique and a subsequent covering lamination or lacquering. Standard labels according to the invention will be perfectly usable for a long row of both general and special applications, and they are, if desired, very easy to provide with a lacquer layer subsequent to the simple printing thereof. Hereby the labels will be particularly moisture resistant, as desirable e.g. when they are used with a tear-off copy on various spare parts, for facilitating reordering thereof.

Preferably, the thin plastic sheet is applied to the paper as a continuous web all over the rear paper side, but it will be within the scope of the invention to arrange the plastic web stripwise only, e.g. as two or more parallel, mutually spaced strips extending in the direction of the label as relevant for the orientation of a desired increased tensile strength thereof. The label may of course still be provided with adhesive over its entire rear side, and if the plastic strips are bonded to the paper by means of a lacquer as evenly applied to the paper, then the lacquer surface as exposed between the strips may of course receive the adhesive and even constitute, itself, a barrier against the adhesive entering into the paper.

It should be mentioned that the use of the said relatively thin paper in the label material, as advantageous for rendering the labels more supple and flexible with several important consequences, also accounts for the advantage that piles or rolls of a label carrying sheet material will hold a relatively high number of labels for any given size of the pile or roll.

At this place it should be emphasized once again that another specific advantage of the invention is the possibility of processing the combined label and backing web in an ordinary label printing and cutting machine with a remarkably high speed, because the "waste" can be pulled off by an applied high pulling force at high speed without the perforated waste web being ruptured.

In the following some examples of the production of a label material web according to the invention are given:

EXAMPLE 1

One side of a paper web of a non-glossy, printable paper having a thickness corresponding to 60 $g/m^2$ is successively provided with a thin lacquer layer and is then successively laid together with a sheet material web of polyester (PETP-film 12 $\mu m$, Eura Paper, Finland) having a thickness of 0.012 mm (12 $\mu m$). This combined web is laminated together with a silicone impregnated carrier paper, which, prior to its engagement with the said combined web, has received a thin surface layer of a pressure sensitive adhesive of a conventional type, whereby the adhesive is brought to stick to the polyester sheet.

EXAMPLE 2

A paper web of a printable paper having a thickness corresponding to 40–60 $g/m^2$ and already at one side being coated with a thin plastic sheet of low resiliency or stretchability, e.g. polyester, as laminated to the paper by means of a hot melt glue, is provided with a thin layer of a pressure sensitive adhesive on its sheet covered side, whereafter this adhering side is covered by a substantially non-adhering, impregnated paper web.

EXAMPLE 3

To one side of a non-glossy, printable paper web (70 $g/m^2$) is applied an unbroken lacquer layer, whereafter the same paper web side is laid together with a number of mutually spaced, parallel, thin plastic sheet strips (8–20 $\mu m$) of low stretchability. The paper web as thus reinforced is laid together with a silicone treated carrier web as provided with a layer of a pressure sensitive adhesive.

While in the foregoing reference has been made to self-adhesive labels comprising a pressure sensitive adhesive, it will be appreciated that the nature of the adhesive is not decisive for the majority of features and advantages of the invention, and it should be mentioned, therefore, that the invention is not limited to any specific type of adhesive Thus, a conventional moisture actuated glue or a heat actuated adhesive would be applicable.

When a low tear off resistance of the labels is desired it will be advantageous to additionally use a known measure for reducing this resistance, viz. to provide the labels and now the associated plastic sheet with a series of edge notches, whereby a label rupture is more easily initiated.

The invention also comprises the disclosed methods of manufacturing a label web, whereby an important advantage is that the said waste may be drawn off at high speed.

We claim:

1. A web of a label sheet material comprising a printable paper laying having a layer of an adhesive at one side thereof, characterized in that the material further comprises a very thin plastic sheet interposed between the paper and the adhesive, the plastic sheet being bonded to the paper and being of a material which has a high tensile strength and a low initial extensibility, the very thin plastic sheet having a sufficiently higher tensile strength and sufficiently low initial extensibility such that the printable paper layer is reinforced and a label can be provided from said label sheet material whose tear stength is low so that the label cannot be removed from its mounting surface without rupture of the label.

2. A web according to claim 1, in which the plastic sheet has a thickness of 5–40 μm.

3. A web according to claim 2, wherein the plastic sheet has thickness of 10–15 μm.

4. A web according to claim 1, in which the plastic sheet is provided as parallel, mutually spaced strips on the paper.

5. A web according to claim 4, in which the strips are bonded to the paper by a layer of lacquer, which layer of lacquer is present on the paper also between the strips.

6. A label as produced from a web according to any one of claims 1,2,4 or 5.

7. A web according to claim 1, in which the thickness of the paper material corresponds to about 40–70 g/m$^2$.

8. A web according to claim 1, in which said plastic shedt is made of a polyester material.

9. A web according to claim 1, further including a backing web adjacent the layer of adhesive at a side of said layer of adhesive opposite to the side thereof nearest the printable paper layer.

10. A web according to claim 1, wherein said plastic sheet is made of a material that prevents the adhesive, of the layer of adhesive, from intruding into the printable paper layer.

11. A web according to claim 1, wherein the plastic sheet is provided as a continuous web on the paper.

12. A web according to claim 1, wherein said label sheet material constitutes a material to provide guarantee sealing of articles having at least two portions movable relative to each other, whereby a label formed of said label sheet material, placed across a separation line between two of said at least two portions, can resist forces acting in the plane of the label while not being strong enough to enable drawing off and remounting of the label across said separation line.

13. A label as produced from a web according to claim 12.

* * * * *